(12) United States Patent
Wang et al.

(10) Patent No.: US 11,237,462 B2
(45) Date of Patent: Feb. 1, 2022

(54) SUPPORTING MECHANISM WITH A ROTATING FUNCTION AND RELATED CAMERA APPARATUS

(71) Applicant: Wistron Corporation, New Taipei (TW)

(72) Inventors: Jia-Syun Wang, New Taipei (TW); Hsin-Shui Chen, New Taipei (TW); Ying-Chi Wu, New Taipei (TW); Hsiang-Ho Lo, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/866,538

(22) Filed: May 4, 2020

(65) Prior Publication Data

US 2021/0181608 A1 Jun. 17, 2021

(30) Foreign Application Priority Data

Dec. 17, 2019 (TW) .................................. 108146132

(51) Int. Cl.
*G03B 17/56* (2021.01)
*F16M 13/02* (2006.01)
*F16M 11/22* (2006.01)
*F16M 11/04* (2006.01)
*F16M 11/08* (2006.01)
*F16M 11/12* (2006.01)
(Continued)

(52) U.S. Cl.
CPC .......... *G03B 17/561* (2013.01); *F16M 11/04* (2013.01); *F16M 11/041* (2013.01); *F16M 11/08* (2013.01); *F16M 11/10* (2013.01); *F16M 11/12* (2013.01); *F16M 11/18* (2013.01); *F16M 11/22* (2013.01); *F16M 13/022* (2013.01); *F16M 13/027* (2013.01); *F16M 2200/08* (2013.01)

(58) Field of Classification Search
CPC ...... G03B 17/56; G03B 17/561; F16M 11/04; F16M 11/12; F16M 11/10; F16M 11/18; F16M 11/041; F16M 11/08; F16M 11/22; F16M 13/022; F16M 13/027; F16M 2200/08
USPC ......................................................... 396/428
See application file for complete search history.

(56) References Cited

U.S. PATENT DOCUMENTS 6,027,257 A * 2/2000 Richards ................ F16M 11/10
248/183.1
8,794,575 B2 * 8/2014 Vogt ..................... G03B 17/561
248/177.1
(Continued)

FOREIGN PATENT DOCUMENTS

CN 204539341 * 8/2015 ............... H04N 7/18
CN 204539341 U 8/2015
(Continued)

*Primary Examiner* — Clayton E. LaBalle
*Assistant Examiner* — Kevin C Butler
(74) *Attorney, Agent, or Firm* — Winston Hsu (57) ABSTRACT

A supporting mechanism with a rotating function is applied to a camera apparatus and includes a casing, a holder, an inner structural component and a damping component. The casing has a first opening. The inner structural component can be rotated relative to the casing. The holder is movably disposed inside the inner structural component and passes through the first opening. The damping component is disposed between the casing and the inner structural component.

20 Claims, 7 Drawing Sheets

(51) Int. Cl.
*F16M 11/18* (2006.01)
*F16M 11/10* (2006.01)

(56) References Cited

U.S. PATENT DOCUMENTS

| | | | |
|---|---|---|---|
| 10,323,964 B2 * | 6/2019 | Jain | G01V 8/00 |
| 2007/0127912 A1 * | 6/2007 | Jones | F16M 11/2014 |
| | | | 396/428 |

FOREIGN PATENT DOCUMENTS

| | | | | |
|---|---|---|---|---|
| CN | 105972411 | * | 9/2016 | F16M 11/18 |
| CN | 106979792 | * | 7/2017 | G01D 11/00 |

* cited by examiner

SUPPORTING MECHANISM WITH A ROTATING FUNCTION AND RELATED CAMERA APPARATUS

BACKGROUND OF THE INVENTION

1. Field of the Invention

The present invention relates to a supporting mechanism and a camera apparatus, and more particularly, to a supporting mechanism with the rotating function and a related camera apparatus.

2. Description of the Prior Art

With the advanced technology, the camera apparatus is installed on the household, the office or the public field for monitoring. The camera apparatus may be stood on the table or fixed on the wall or suspended on the ceiling via the kickstand in different situations. The conventional camera apparatus utilizes the motor to pan and tilt the camera lens for adjusting angles of elevation and depression and rotation of the camera lens. However, the camera lens may be unable to focus on a specific angle via the motor, and thus a universal joint is connected between the camera apparatus and the kickstand. The user can manually pan and tilt the camera apparatus relative to the kickstand via the universal joint. The conventional kickstand with the universal joint has a multi-supporting structure with complicated design to provide high strength supporting force and further to prevent the camera lens from detachment because of frequent rotation, and has drawbacks of difficult assembly and inartistic appearance.

SUMMARY OF THE INVENTION

The present invention provides a supporting mechanism with the rotating function and a related camera apparatus for solving above drawbacks.

According to the claimed invention, a supporting mechanism with a rotating function includes a casing, an inner structural component, a holder and a holder. The casing has a first opening. The inner structural component can be rotated relative to the casing. The holder is movably disposed inside the inner structural component and passes through the first opening. The damping component is disposed between the casing and the inner structural component.

According to the claimed invention, the supporting mechanism further includes a supporter movably disposed inside the casing, the holder being movably disposed on the supporter.

According to the claimed invention, the supporter includes a first connecting portion, and the holder includes a second connecting portion movably assembled with the first connecting portion.

According to the claimed invention, the first connecting portion is a sunken slot structure, and the second connecting portion is a pillar structure embedded in the sunken slot structure.

According to the claimed invention, the supporting mechanism includes a stand having a first position portion, and the supporter has a second positioning portion, and the stand utilizes the first position portion rotatably assembled with the second positioning portion to stand the supporter.

According to the claimed invention, the holder is able to rotate relative to the supporter in a first direction, and the supporter is able to rotate relative to the stand in a second direction different from the first direction. The second direction is perpendicular to the first direction.

According to the claimed invention, the first position portion is a concave portion, and the second positioning portion is a protrude portion embedded in the concave portion.

According to the claimed invention, the inner structural component includes a first side and a second side opposite to each other. The inner structural component further includes a second opening formed on the first side, and the supporter is assembled with the second side. A sectional dimension of the second side is greater than a sectional dimension of the first side.

According to the claimed invention, the inner structural component and the casing are cone-type forms.

According to the claimed invention, the holder further includes a bar portion connected to the second connecting portion, and the bar portion is an elliptic cylinder form or a circular cylinder form.

According to the claimed invention, an assembly of the bar portion and the second connecting portion is formed as a reversed T-type structure.

According to the claimed invention, the damping component is made by resilient material, and an outer surface of the inner structural component or an inner surface of the casing is surrounded by the damping component.

According to the claimed invention, the damping component is at least one protrude structure or at least one concave structure disposed on an outer surface of the inner structural component. An inner surface of the casing includes at least one concave structure or at least one protrude structure in accordance with the damping component. The at least one protrude structure and the at least one concave structure are detachably engaged with each other.

According to the claimed invention, the damping component is made by coating material disposed on an outer surface of the inner structural component or an inner surface of the casing.

According to the claimed invention, the damping component is a texture structure formed on an outer surface of the inner structural component or an inner surface of the casing.

According to the claimed invention, the supporting mechanism further includes a base and a weighting component, and the weighting component is disposed inside the casing, and the base is connected to the casing to fix the weighting component.

According to the claimed invention, a camera apparatus with a rotating function includes a camera and a supporting mechanism. The supporting mechanism includes a casing, an inner structural component, a holder and a holder. The casing has a first opening. The inner structural component can be rotated relative to the casing for driving rotation of the camera. The holder is movably disposed inside the inner structural component and passes through the first opening to connect with the camera. The damping component is disposed between the casing and the inner structural component.

The supporting mechanism of the present application can hide all components inside the space formed by the casing and the base. A soft gasket or a spacer can be optionally disposed between any two adjacent components. The holder of the supporting mechanism can be rotated between the supporter and the inner structural component in the first direction. The assembly of the supporter and the inner structural component can be freely rotated between the casing and the stand in the second direction. The supporting mechanism can have the stepless rotation-controlling function or the multistep rotation-controlling function in accordance with material property of the damping component set between the casing and the inner structural component. As if the inner structural component does not fully cover the supporter, a part of the damping component can be disposed on the outer surface of the supporter and contact against the casing to generate the damping and the friction.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Please refer to FIG. 6.

DETAILED DESCRIPTION

Figure 1:
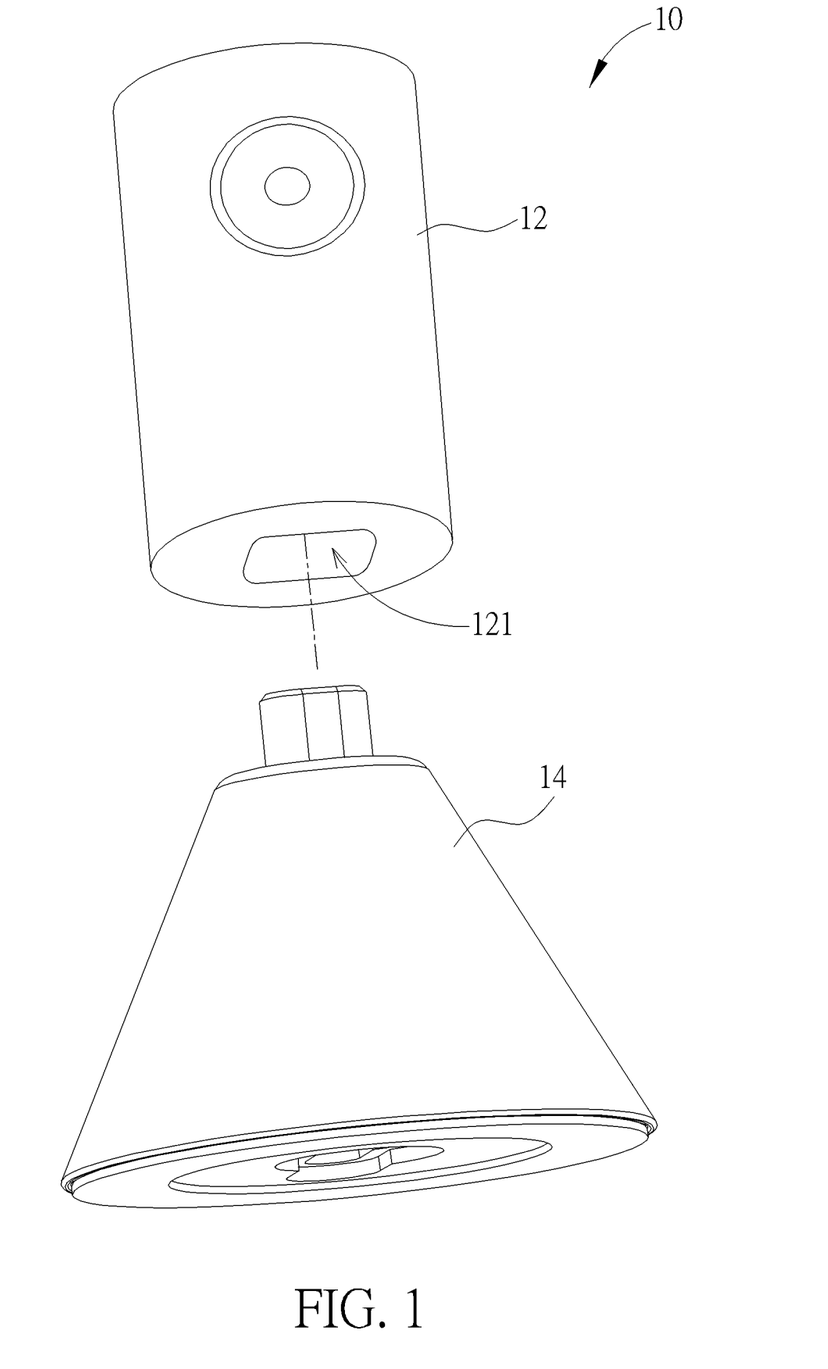
FIG. 1 is a diagram of a camera apparatus according to an embodiment of the present application.

Please refer to FIG. 1. FIG. 1 is a diagram of a camera apparatus 10 according to an embodiment of the present application. The camera apparatus 10 can include a camera 12 and a supporting mechanism 14. The camera 12 can be any type of camera. Any camera having a socket 121 capable of connecting with a supporting mechanism 14 conforms to a design purpose of the camera 12 of the present application. The supporting mechanism 14 can be put on any working surface, such as the table, the wall and the ceiling, which depends on an actual demand. As the camera 12 is assembled with the supporting mechanism 14, the camera 12 can be rotated relative to the working surface via the supporting mechanism 14 in a first direction D1, and further can be rotated in a second direction D2 for multidirectional movement execution. The second direction D2 can be perpendicular to the first direction D1.

Figure 2:
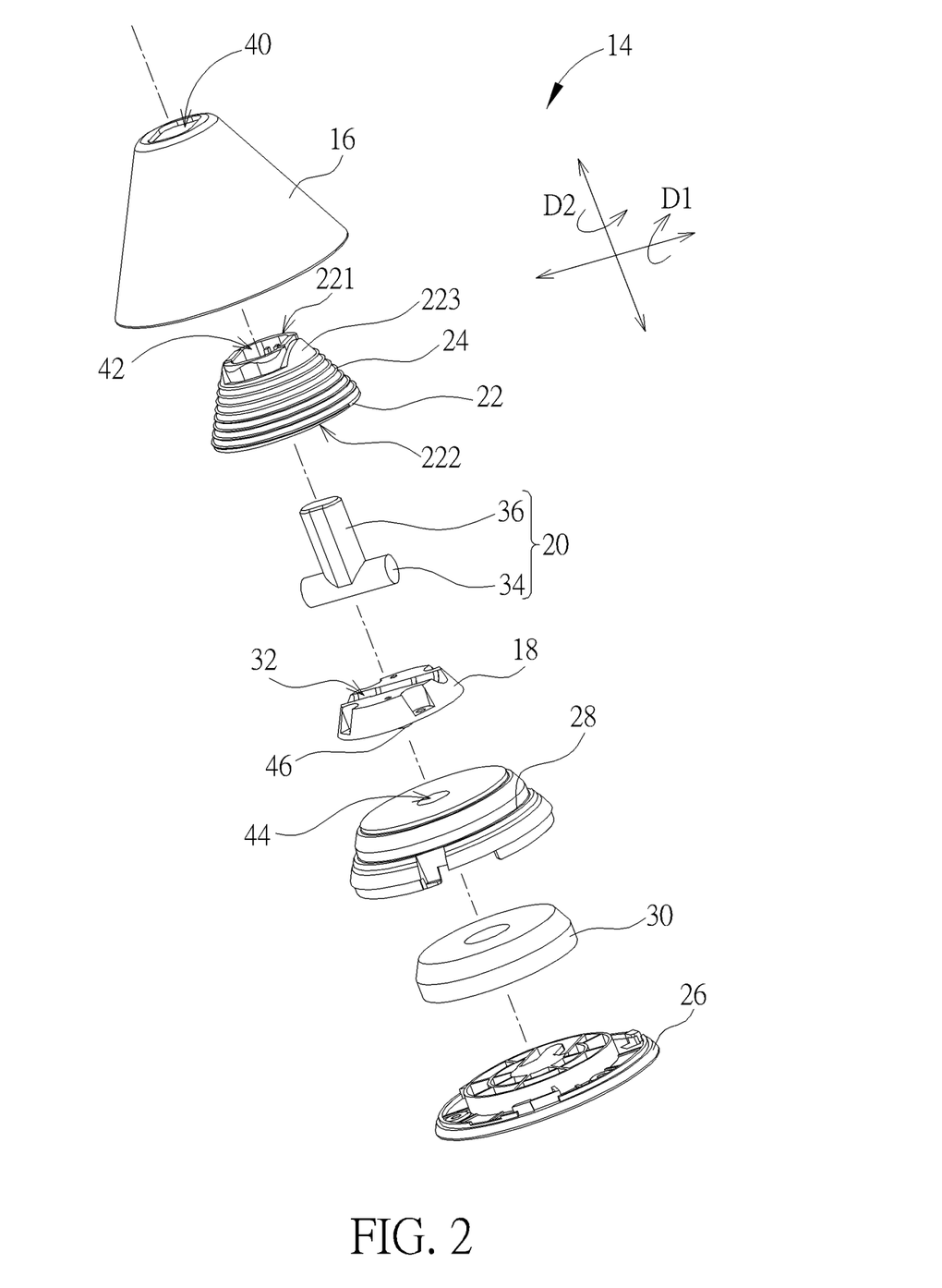
FIG. 2 is an exploded diagram of a supporting mechanism according to the embodiment of the present application.
Figure 3:
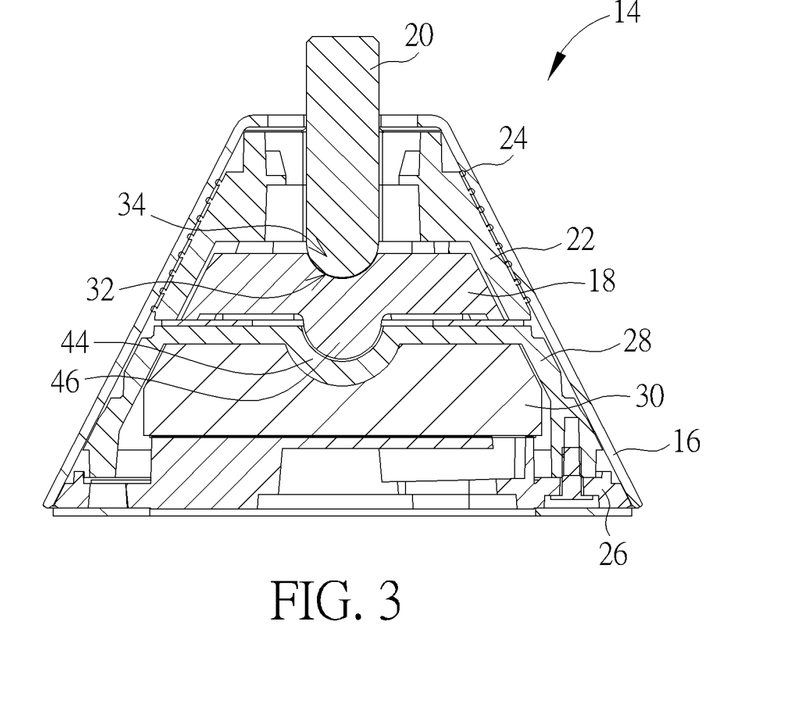
FIG. 3 is a sectional view of the supporting mechanism according to the embodiment of the present application.
Figure 4:
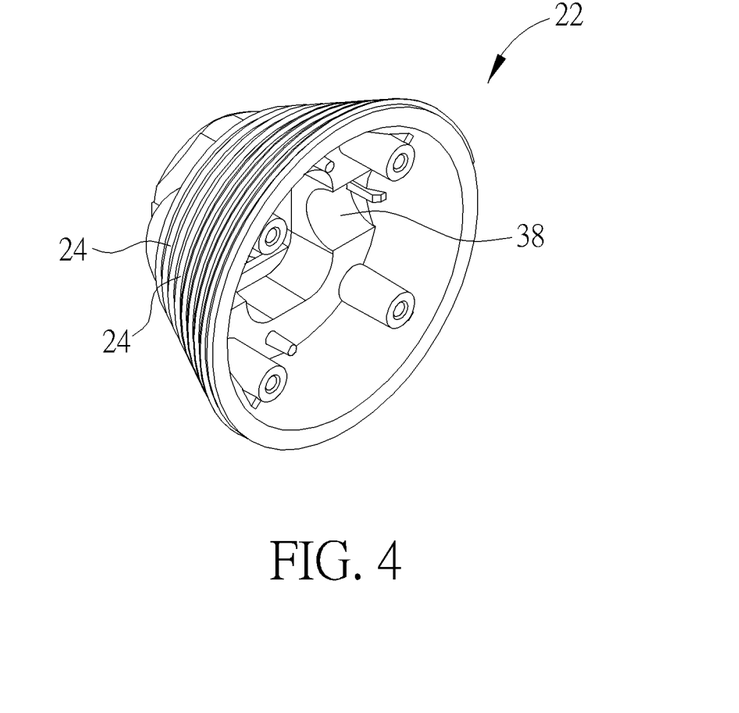
FIG. 4 is a diagram of an inner structural component in another view according to the embodiment of the present application.
Figure 5:
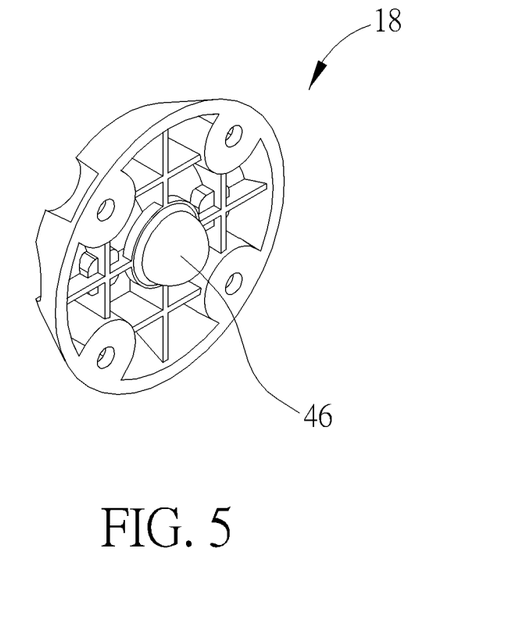
FIG. 5 is a diagram of a supporter in another view according to the embodiment of the present application.

Please refer to FIG. 1 to FIG. 5. FIG. 2 is an exploded diagram of the supporting mechanism 14 according to the embodiment of the present application. FIG. 3 is a sectional view of the supporting mechanism 14 according to the embodiment of the present application. FIG. 4 is a diagram of the inner structural component 22 in another view according to the embodiment of the present application. FIG. 5 is a diagram of the supporter 18 in another view according to the embodiment of the present application. The supporting mechanism 14 can include a casing 16, a supporter 18, a holder 20, an inner structural component 22, a damping component 24, a base 26, a stand 28 and a weighting component 30. The supporter 18 can have a first connecting portion 32. A hooking structure 38 similar to the first connecting portion 32 can be optionally disposed inside the inner structural component 22. The holder 20 can have a second connecting portion 34 and a bar portion 36. An assembly of the second connecting portion 34 and the bar portion 36 can be formed as a reversed T-type structure. The holder 20 can be disposed between the supporter 18 and the inner structural component 22, and further be movably disposed inside the inner structural component 22. The second connecting portion 34 can be movably assembled with the first connecting portion 32 for free rotation. The inner structural component 22 can be lowered to assemble with the supporter 18. An assembly of the first connecting portion 32 and the hooking structure 38 can buckle the second connecting portion 34 for preventing the holder 20 and the supporter 18 from separation.

In the embodiment of the present application, the first connecting portion 32 and the hooking structure 38 can be bar-type sunken slot structures, and the second connecting portion 34 can be a pillar structure. A shape and a size of the pillar structure correspond to space formed by the foresaid bar-type sunken slot structures, which means the pillar structure can be embedded in the bar-type sunken slot structures, so that the holder 20 can be rotated between the supporter 18 and the inner structural component 22 in one direction. The inner structural component 22 can be disposed inside the casing 16. The casing 16 can have a first opening 40, and the inner structural component 22 can have a second opening 42. The bar portion 36 of the holder 20 can pass through the first opening 40 and the second opening 42 to connect with the camera 12. Generally, the holder 20 can be made by magnetic material, and the camera 12 can dispose one or some magnetic units (which are not shown in the figures) around the socket 121. The holder 20 can be tightly assembled with the camera 12 via magnetic attraction function when inserting into the socket 121; however, an actual application is not limited to the above-mentioned embodiment. For example, the holder 20 can be connected with the camera 12 via a screw or structural engagement.

The base 26 can be disposed on a bottom of the casing 16 for covering the supporter 18, the holder 20, the inner structural component 22, the damping component 24, the stand 28 and the weighting component 30. The stand 28 can be disposed on the base 26, so that the weighting component 30 can be clipped by the stand 28 and the base 26. The supporter 18 can be rotatably disposed on the stand 28, which means an assembly of the supporter 18, the holder 20 and the inner structural component 22 can be freely rotated inside the casing 16. The supporter 18 and the stand 28 can achieve rotatable motion via a variety of structural design. For example, the present application can dispose a first position portion 44 on the stand 28, and the first position portion 44 can be rotatably assembled with a second positioning portion 46 of the supporter 18, so that the stand 28 can stably stand the supporter 18. Thus, the holder 20 can be rotated relative to the supporter 18 in the first direction D1, and the supporter 18 can be rotated relative to the stand 28 in the second direction D2. The first direction D1 can be a rotating direction of the holder 20, and the second direction D2 can be a rotating direction of the supporter 18.

In the embodiment of the present application, the first position portion 44 can be a concave portion, and the second positioning portion 46 can be a protrude portion. The protrude portion can be rotatably embedded in the concave portion for allowing rotation between the supporter 18 and the stand 28; however, an actual application is not limited to the above-mentioned embodiment. An assembly of the first position portion 44 and the second positioning portion 46 can provide not only the rotating function, but also a positioning function for assembling the stand 28 with the supporter 18, so as to increase an assembling yield and rotation fluency.

In other possible embodiment, the first position portion 44 can be the protrude portion, and the second positioning portion 46 can be the concave portion. The first position portion 44 and the second positioning portion 46 can be embedded in a rotatable manner for allowing the rotation between the supporter 18 and the stand 28. Further, the first position portion 44 and the second positioning portion 46 can be any structures which can be matched or engaged with other. Any assembly of the first position portion 44 and the second positioning portion 46 capable of freely rotating the supporter 18 relative to the stand 28 conforms to a design demand of the present application.

It should be mentioned that the casing 16 and the inner structural component 22 can be designed as two funneled structures with similar dimensions, which depend on the actual demand. For example, the inner structural component 22 can have a first side 221 and a second side 222 opposite to each other. The second opening 42 can be formed on the first side 221, and the supporter 18 can be connected with the second side 222. A sectional dimension of a part of the inner structural component 22 close to the second side 222 can be preferably greater than a sectional dimension of another part of the inner structural component 22 close to the first side 221, and structural property of the casing 16 can be similar to ones of the inner structural component 22, which means the casing 16 and the inner structural component 22 are cone-type forms with a wide bottom and a narrow top, so that the inner structural component 22 can be easily and smoothly installed into the casing 16 for increasing the assembling yield and repair efficiency.

Figure 6:
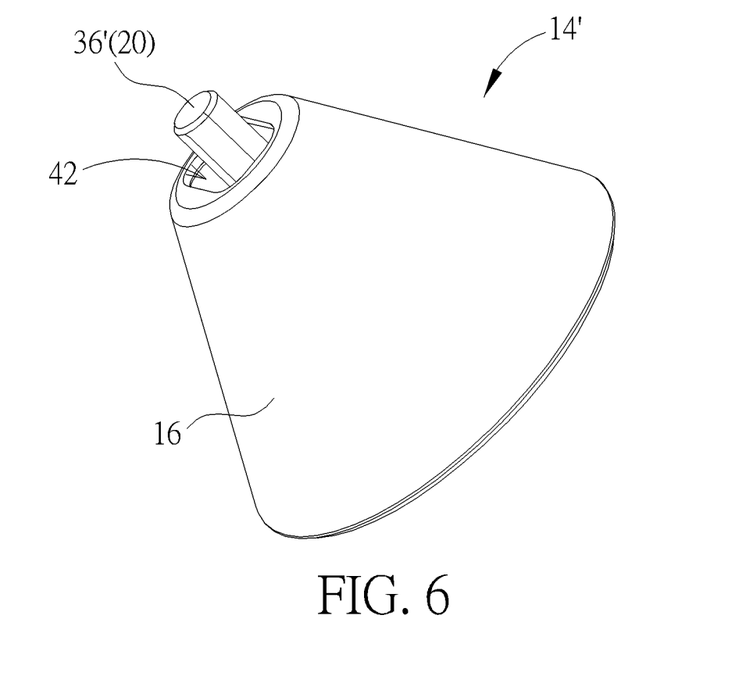
FIG. 6 is a diagram of a part of the supporting mechanism according to another embodiment of the present application.

In the embodiment, the bar portion 36 of the holder 20 can be an elliptic cylinder form. A shape and a curvature of the elliptic cylinder form can be particularly designed to have structural parameters conforming to the socket 121 of the camera 12. Design of the bar portion 36 can provide a foolproof function and therefore a user can easily assemble the camera 12 with the supporting mechanism 14. Further, the bar portion 36 of the holder 20 may be designed as any other structures. Please refer to FIG. 6. FIG. 6 is a diagram of a part of the supporting mechanism 14' according to another embodiment of the present application. The holder 20 of the supporting mechanism 14' can have the bar portion 36' with a circular cylinder form, and the camera 12 can have the socket (which is not shown in the figures) with a corresponding structure. The camera 12 can be freely rotated relative to the holder 20 when the bar portion 36' (having the circular cylinder form) of the holder 20 is assembled with the circular socket of the camera 12.

The damping component 24 can be disposed between the casing 16 and the inner structural component 22. Two opposite surfaces of the damping component 24 can respectively contact against the casing 16 and the inner structural component 22 to generate damping or friction. A quantity of the damping or the friction can be adjusted by varying structural parameters and arrangement of the damping component 24 in accordance with the user's demand. In the embodiment, the damping component 24 can be made by resilient material, such as rubber, and the supporting mechanism 14 can provide stepless rotation-controlling function. The damping component 24 can surround or be separately disposed on an outer surface 223 of the inner structural component 22, or can surround or be separately disposed on an inner surface (which is not shown in the figures) of the casing 16, or can surround or be separately disposed on the outer surface 223 of the inner structural component 22 and the inner surface of the casing 16 simultaneously. A width, a thickness, hardness, a length and any structural parameters of the damping component 24 are designed according to the user's demand, and a detailed description is omitted herein for simplicity.

Figure 7:
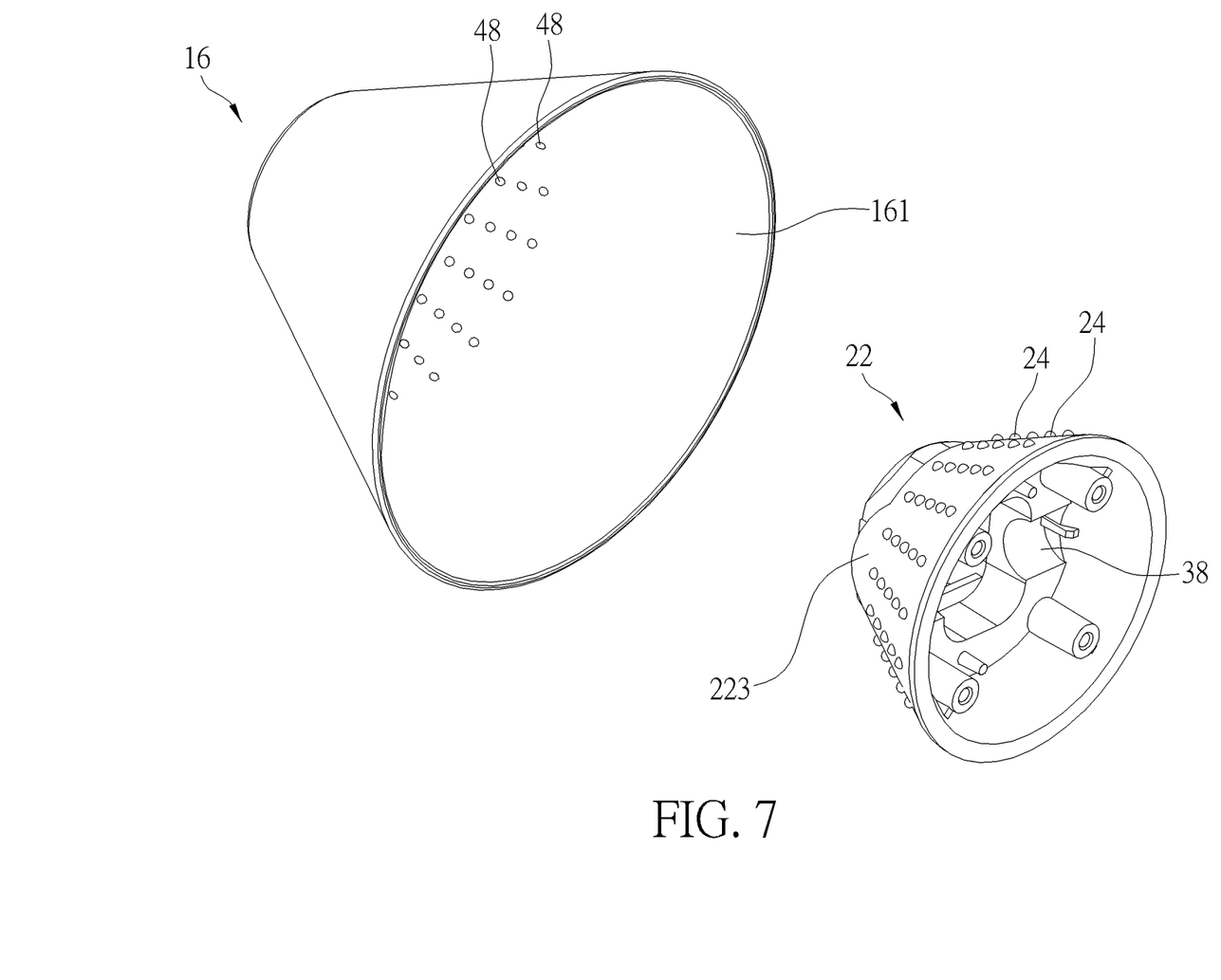
FIG. 7 to FIG. 10 are diagrams of a damping component according to different embodiments of the present application.
Figure 8:
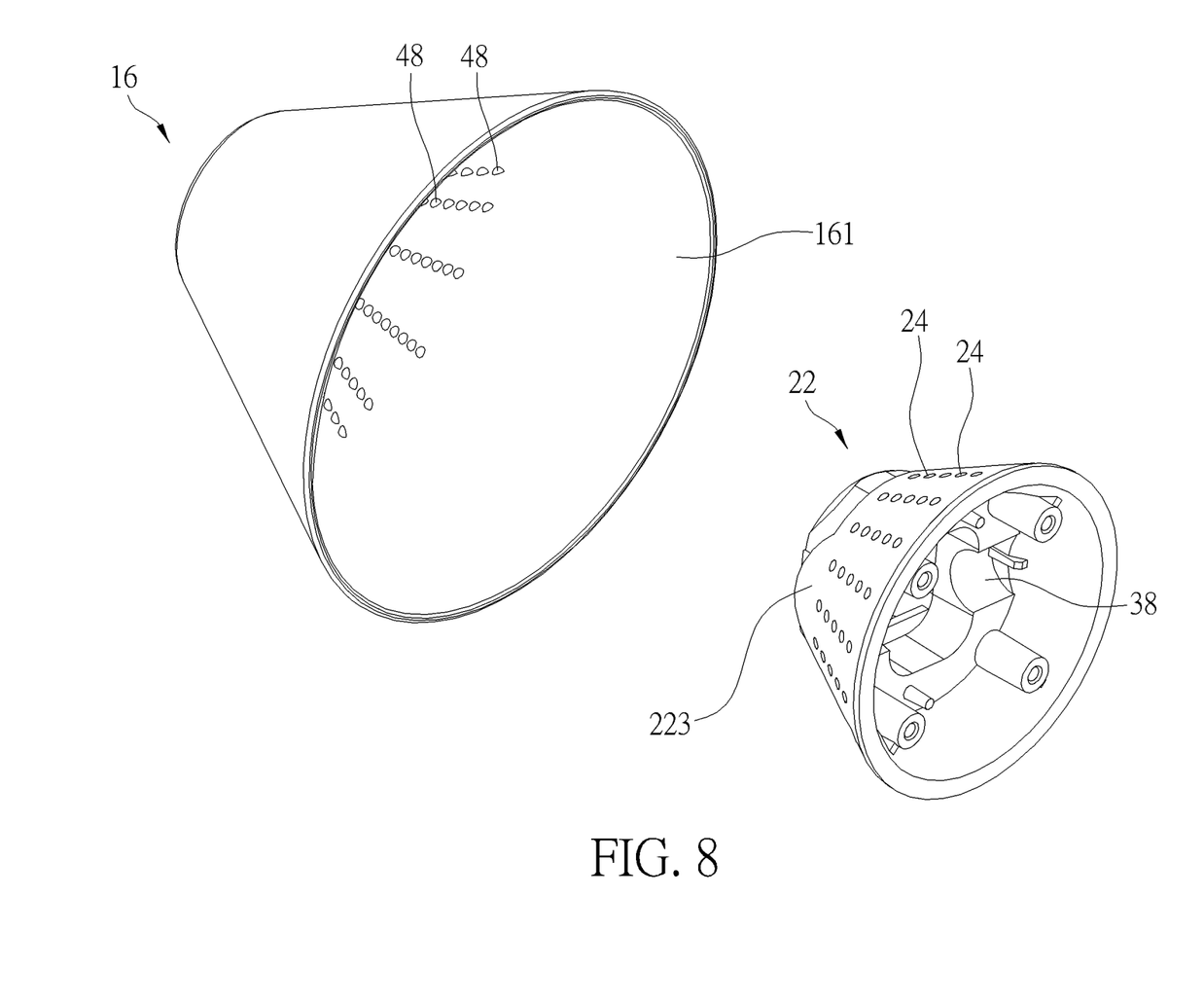

Please refer to FIG. 7 to FIG. 10. FIG. 7 to FIG. 10 are diagrams of the damping component 24 according to different embodiments of the present application. As shown in FIG. 7, the damping component 24 can be one protrude structure or a plurality of protrude structures. The plurality of protrude structures can be disposed on the outer surface 223 of the inner structural component 22 in a loose manner; meanwhile, the casing 16 can have an engaging portion 48 with a corresponding amount, such as the concave structure formed on the inner surface 161. When the inner structural component 22 is rotated, the damping component 24 can be engaged with the engaging portion 48 for constraining relative rotation between the inner structural component 22 and the casing 16. The user can force the inner structural component 22 to separate the damping component 24 from the engaging portion 48, so as to provide multistep rotation-controlling function. As shown in FIG. 8, the damping component 24 can be one concave structure or a plurality of concave structures, and an amount of the protrude structure on the inner surface 161 of the casing 16 can be the same as an amount of the concave structure. The user can enlarge or reduce the force applied for the supporting mechanism 14 so as to engage the concave structure with the protrude structure or to separate the concave structure from the protrude structure, and the multistep rotation-controlling function can be provided accordingly.

Figure 9:
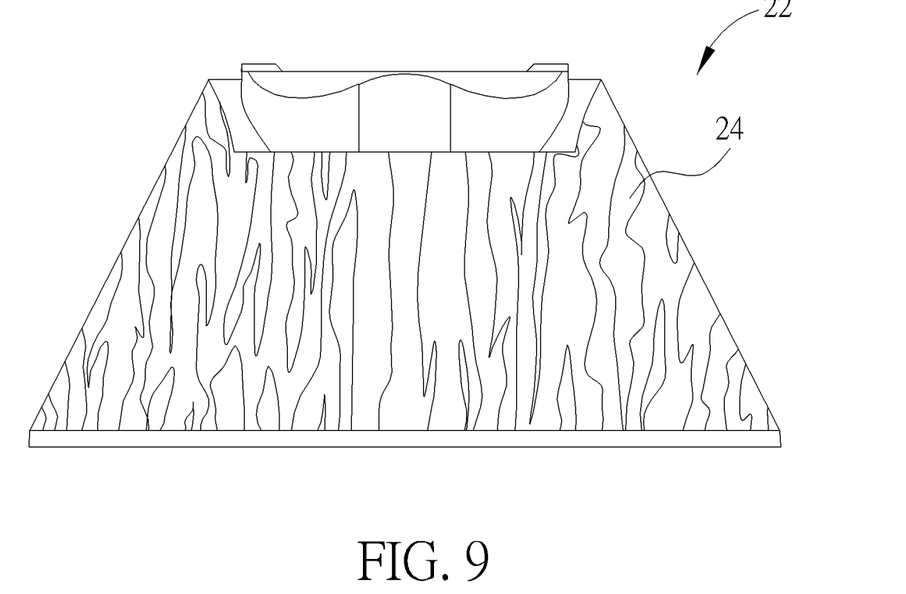
Figure 10:
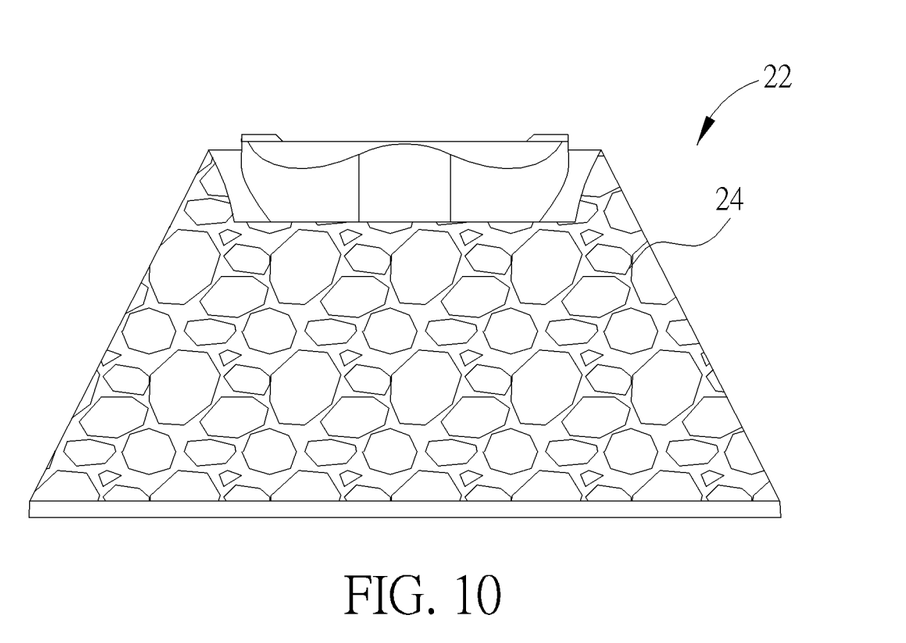

As shown in FIG. 9, the damping component 24 can be made by coating material and adapted to paint on the outer surface 223 of the inner structural component 22 and/or the inner surface 161 of the casing 16. The outer surface 223 and/or the inner surface 161 can be rough via the coating material. Property and painting skill of the coating material are not limited, and any coating material capable of being completely or partly distributed on the inner structural component 22 and/or the casing 16 to generate the damping with sufficient strength belongs to the design scope of the present application. As shown in FIG. 10, the damping component 24 can be a texture structure formed on the outer surface 223 of the inner structural component 22 and/or the inner surface 161 of the casing 16. Property and manufacturing skill of the texture structure can depend on material quality of the inner structural component 22 and the casing 16. The texture structure can be all over or some part of the inner structural component 22 and/or the casing 16, and a detailed description is omitted herein for simplicity. In the embodiments shown in FIG. 9 and FIG. 10, the supporting mechanism 14 can have the stepless rotation-controlling function via the damping component 24.

In conclusion, the supporting mechanism of the present application can hide all components inside the space formed by the casing and the base. A soft gasket or a spacer can be optionally disposed between any two adjacent components. The holder of the supporting mechanism can be rotated between the supporter and the inner structural component in the first direction. The assembly of the supporter and the inner structural component can be freely rotated between the casing and the stand in the second direction. The supporting mechanism can have the stepless rotation-controlling function or the multistep rotation-controlling function in accordance with material property of the damping component set between the casing and the inner structural component. As if the inner structural component does not fully cover the supporter, a part of the damping component can be disposed on the outer surface of the supporter and contact against the casing to generate the damping and the friction. Comparing to the prior art, the supporting mechanism and the camera apparatus of the present application can utilize simple mechanical design to allow unidirectional and multidirectional rotation of the camera, and have advantages of simple assembly, easy operation and artistic outward appearance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A supporting mechanism with a rotating function, comprising:
   a casing, the casing having a first opening:
   an inner structural component configured to be rotated relative to the casing in a rotating direction;
   a holder movably disposed inside the inner structural component and passing through the first opening to rotate relative to the inner structural component in an oscillating direction; and
   a damping component disposed between the casing and the inner structural component;
   wherein the oscillating direction is a first direction, and the rotating direction is a second direction different from the first direction.

2. The supporting mechanism of claim 1, further comprising:
   a supporter movably disposed inside the casing, the holder being movably disposed on the supporter.

3. The supporting mechanism of claim 2, wherein the supporter comprises a first connecting portion, and the holder comprises a second connecting portion movably assembled with the first connecting portion.

4. The supporting mechanism of claim 3, wherein the first connecting portion is a sunken slot structure, and the second connecting portion is a pillar structure embedded in the sunken slot structure.

5. The supporting mechanism of claim 3, wherein the holder further comprises a bar portion connected to the second connecting portion, the bar portion is an elliptic cylinder form or a circular cylinder form, an assembly of the bar portion and the second connecting portion is formed as a reversed T-type structure.

6. The supporting mechanism of claim 2, wherein the supporting mechanism comprises a stand having a first position portion, and the supporter has a second positioning portion, and the stand utilizes the first position portion rotatably assembled with the second positioning portion to stand the supporter.

7. The supporting mechanism of claim 6, wherein the holder is able to rotate relative to the supporter in the first direction, and the supporter is able to rotate relative to the stand in the second direction.

8. The supporting mechanism of claim 7, wherein the second direction is perpendicular to the first direction.

9. The supporting mechanism of claim 6, wherein the first position portion is a concave portion, and the second positioning portion is a protrude portion embedded in the concave portion.

10. The supporting mechanism of claim 2, wherein the inner structural component comprises a first side and a second side opposite to each other, and the inner structural component further comprises a second opening formed on the first side, and the supporter is assembled with the second side, and a sectional dimension of the second side is greater than a sectional dimension of the first side.

11. The camera apparatus of claim 2, wherein the supporter comprises a first connecting portion, and the holder comprises a second connecting portion and a bar portion connected to each other, and the second connecting portion is movably assembled with the first connecting portion, and the supporting mechanism further comprises a stand having a first position portion, and the supporter has a second positioning portion, and the stand utilizes the first position portion rotatably assembled with the second positioning portion to stand the supporter, and the bar portion is a elliptic cylinder form or a circular cylinder form.

12. The supporting mechanism of claim 1, wherein the inner structural component and the casing are cone-type forms.

13. The supporting mechanism of claim 1, wherein the damping component is made by resilient material, and an outer surface of the inner structural component or an inner surface of the casing is surrounded by the damping component.

14. The supporting mechanism of claim 1, wherein the damping component is at least one protrude structure or at least one concave structure disposed on an outer surface of the inner structural component, an inner surface of the casing comprises at least one concave structure or at least one protrude structure in accordance with the damping component, the at least one protrude structure and the at least one concave structure are detachably engaged with each other.

15. The supporting mechanism of claim 1, wherein the damping component is made by coating material disposed on an outer surface of the inner structural component or an inner surface of the casing.

16. The supporting mechanism of claim 1, wherein the damping component is a texture structure formed on an outer surface of the inner structural component or an inner surface of the casing.

17. The supporting mechanism of claim 1, wherein the supporting mechanism further comprises a base and a weighting component, and the weighting component is disposed inside the casing, and the base is connected to the casing to fix the weighting component.

18. The camera apparatus of claim 1, wherein the supporting mechanism further comprises a supporter movably disposed inside the casing, and holder is movably disposed on the supporter.

19. A camera apparatus with a rotating function, comprising:
   a camera; and
   a supporting mechanism, comprising:
      a casing, the casing having a first opening:
      an inner structural component configured to be rotated relative to the casing in a rotating direction for driving rotation of the camera;
      a holder movably disposed inside the inner structural component and passing through the first opening to rotate relative to the inner structural component in an oscillating direction for connecting with the camera; and
      a damping component disposed between the casing and the inner structural component;

wherein the oscillating direction is a first direction, and the rotating direction is a second direction different from the first direction.

20. The camera apparatus of claim 19, wherein the camera comprises a socket, and the holder is connected with the socket of the camera.

* * * * *